United States Patent
Wang et al.

(10) Patent No.: US 11,227,213 B2
(45) Date of Patent: Jan. 18, 2022

(54) DEVICE AND METHOD FOR IMPROVING PROCESSING SPEED OF NEURAL NETWORK

(71) Applicant: FUJITSU LIMITED, Kawasaki (JP)

(72) Inventors: Liuan Wang, Beijing (CN); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 1035 days.

(21) Appl. No.: 15/799,151

(22) Filed: Oct. 31, 2017

(65) Prior Publication Data
US 2018/0189650 A1    Jul. 5, 2018

(30) Foreign Application Priority Data
Dec. 30, 2016   (CN) .......................... 201611255449.8

(51) Int. Cl.
*G06N 3/08* (2006.01)
*G06N 3/04* (2006.01)

(52) U.S. Cl.
CPC ................. *G06N 3/08* (2013.01); *G06N 3/04* (2013.01); *G06N 3/0454* (2013.01); *G06N 3/082* (2013.01); *G06N 3/084* (2013.01)

(58) Field of Classification Search
CPC .................................... G06N 3/08; G06N 3/04
See application file for complete search history.

(56) References Cited

U.S. PATENT DOCUMENTS

| | | | | |
|---|---|---|---|---|
| 10,509,996 B2 * | 12/2019 | Dalton | ...................... | G06N 3/08 |
| 2008/0312942 A1 * | 12/2008 | Katta | ...................... | G06Q 10/04 |
| | | | | 705/7.34 |
| 2011/0091113 A1 * | 4/2011 | Ito | ...................... | G06K 9/00315 |
| | | | | 382/197 |
| 2011/0167024 A1 * | 7/2011 | Maldonado Diaz | ... | G06N 3/086 |
| | | | | 706/10 |
| 2016/0174902 A1 * | 6/2016 | Georgescu | ............ | G06T 7/0012 |
| | | | | 600/408 |
| 2018/0046903 A1 * | 2/2018 | Yao | ........................ | G06N 3/082 |
| 2018/0046919 A1 * | 2/2018 | Li | .......................... | G10L 15/16 |

OTHER PUBLICATIONS

Gong et al. (Compressing Deep Convolutional Networks Using Vector Quantization, Dec. 2014, pp. 1-10) (Year: 2014).*
Muknahallipatna (Input Dimension Reduction in Neural Network Training—Case Study in Transient Stability Assessment of Large Systems, Feb. 1996, pp. 50-54) (Year: 1996).*

* cited by examiner

*Primary Examiner* — George Giroux
(74) *Attorney, Agent, or Firm* — Staas & Halsey, LLP

(57) ABSTRACT

A device and a method for improving a processing speed of a neural network and applications thereof in the neural network where the device includes a processor configured to perform: determining, according to a predetermined processing speed improvement target, a dimension reduction amount of each of one or more parameter matrixes in the neural network obtained through training; preprocessing each parameter matrix based on the dimension reduction amount of the parameter matrix; and retraining the neural network based on a result of the preprocessing to obtain one or more dimension reduced parameter matrixes so as to ensure performance of the neural network meets a predetermined requirement. According to the embodiments of the present disclosure, it is possible to significantly improve the processing speed of the neural network while ensuring the performance of the neural network meets the predetermined requirement.

16 Claims, 7 Drawing Sheets

DEVICE AND METHOD FOR IMPROVING PROCESSING SPEED OF NEURAL NETWORK

CROSS-REFERENCE TO RELATED APPLICATIONS

This application claims the benefit of priority of the Chinese Patent Application No. 201611255449.8 filed with the Chinese State Intellectual Property Office on Dec. 30, 2016 and entitled "device and method for improving processing speed of neural network and application thereof", the entire disclosure of which is incorporated herein by reference.

BACKGROUND

1. Field

The present disclosure relates to the field of deep learning, and in particular to a device and method for improving a processing speed of a neural network and applications of the device and the method in the neural network.

2. Description of the Related Art

In recent years, methods based on neural network (such as Convolutional Neural Network (CNN), Recurrent Neural Network (RNN), Long Short-Term Memory (LSTM) Network and the like) have achieved excellent performance in a large number of applications. The key technology of these methods is to find out an approach for successfully training a large and deep neural network model with a data set having finite samples. The large and deep neural network model has a strong expression capability and can model complex data. However, such a large and deep network structure always requires a lot of processing time for inference to achieve better performance.

Conventional technologies for improving the processing speed of the neural network (i.e., accelerating the inference process) mainly focus on aspects including loop unrolling, convolution layer low-rank expansion in the CNN, parallel accumulation and the like, such as Basic Linear Algebra Subprograms (BLAS) package and Single Instruction Multiple Data (SIMD).

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

Generally, an inference process of a neural network involves matrix multiplication. As the scale and the depth of the neural network increase, the scale of the matrix is also increasing, resulting in exponential increase of computational amount in the matrix multiplication related to the inference process, thereby greatly reducing the processing speed of the neural network. Taking the Convolutional Neural Network (CNN) as an example, about 99% of processing time of the neural network is spent on a convolution layer and a fully connected layer, and these layers are mainly realized by matrix multiplication. Therefore, if the computational amount in the matrix multiplication can be reduced, then the inference process of the neural network can be greatly accelerated, hence significantly improving the processing speed of the neural network.

In view of the above, an object of the present disclosure is to provide a device and method for improving a processing speed of a neural network and applications of the device and the method in the neural network, which may reduce the computational amount in matrix multiplication by reducing the dimensions of a matrix while ensuring performance of the neural network meets a predetermined requirement, thereby improving the processing speed of the neural network.

According to an aspect of the present disclosure, a device for improving a processing speed of a neural network is provided. The device includes a processor configured to perform: determining, according to a predetermined processing speed improvement target, a dimension reduction amount of each of one or more parameter matrixes/matrices in the neural network obtained through training; preprocessing each parameter matrix based on the dimension reduction amount of the parameter matrix; and retraining the neural network based on a result of the preprocessing to obtain one or more dimension reduced parameter matrixes so as to ensure performance of the neural network meets a predetermined requirement.

According to a preferred embodiment of the present disclosure, the dimension reduction amount represents a column dimension reduction amount of each parameter matrix, and the processor is further configured to perform the pre-processing by performing following operations for each parameter matrix: calculating a column score of each of columns of the parameter matrix according to values of parameters in each column of the parameter matrix; and zeroing, according to the column dimension reduction amount of the parameter matrix, the parameters in a column the column score of which meets a predetermined condition.

According to a preferred embodiment of the present disclosure, the processor may be further configured to calculate, for each parameter matrix, a sum of absolute values of the parameters in each column of the parameter matrix as the column score of the column.

According to a preferred embodiment of the present disclosure, the processor may be further configured to calculate, for each parameter matrix, the column score according to loss weights associated with the parameters in each column of the parameter matrix.

According to a preferred embodiment of the present disclosure, the processor may be further configured to normalize all of the parameters and the loss weights in each of the one or more parameter matrixes; and calculate, for each parameter matrix, a sum of weighted sums of the normalized parameters and the normalized loss weights in each column of the parameter matrix as the column score.

According to a preferred embodiment of the present disclosure, the processor may be further configured to retrain, according to the one or more parameter matrixes with corresponding columns being zeroed, the neural network to obtain one or more column dimension reduced parameter matrixes.

According to a preferred embodiment of the present disclosure, the processor may be further configured to zero, according to the zeroed column of each parameter matrix, elements in a corresponding row of an input matrix corresponding to the parameter matrix; and retrain the neural network according to the one or more parameter matrixes with corresponding columns being zeroed and one or more input matrixes with corresponding rows being zeroed to obtain the one or more dimension reduced parameter matrixes.

According to a preferred embodiment of the present disclosure, the processor may be further configured to perform: determining, according to another predetermined processing speed improvement target, a dimension reduction amount of each of the one or more dimension reduced parameter matrixes obtained through retraining; re-preprocessing each parameter matrix based on the determined dimension reduction amount of the parameter matrix; and retraining, based on a result of the re-preprocessing, the neural network to obtain one or more parameter matrixes with dimensions being reduced again to ensure the performance of the neural network meets the predetermined requirement, in which the determining, the re-preprocessing and the retraining are performed repeatedly until one or more dimension reduced parameter matrixes meeting a final processing speed improvement target are obtained.

According to another aspect of the present disclosure, a method for improving a processing speed of a neural network is further provided. The method includes: determining, according to a predetermined processing speed improvement target, a dimension reduction amount of each of one or more parameter matrixes in the neural network obtained through training; preprocessing each parameter matrix based on the dimension reduction amount of the parameter matrix; and retraining the neural network based on a result of the preprocessing to obtain one or more dimension reduced parameter matrixes so as to ensure performance of the neural network meets a predetermined requirement.

According to yet another aspect of the present disclosure, a device for performing an inference process in a neural network is further provided. The device includes a processor configured to: convert a current parameter matrix into a dimension reduced parameter matrix by performing the method for improving the processing speed of the neural network described above; convert, according to the dimension reduced parameter matrix, an input matrix corresponding to the current parameter matrix into a dimension reduced input matrix accordingly; and multiply the dimension reduced parameter matrix by the dimension reduced input matrix to obtain an output matrix.

According to still another aspect of the present disclosure, a method executed in an inference engine in a neural network is further provided. The method includes: converting a current parameter matrix into a dimension reduced parameter matrix by performing the method for improving the processing speed of the neural network described above; converting, according to the dimension reduced parameter matrix, an input matrix corresponding to the current parameter matrix into a dimension reduced input matrix accordingly; and multiplying the dimension reduced parameter matrix by the dimension reduced input matrix to obtain an output matrix.

According to other aspects of the present disclosure, it is further provided computer program codes and a computer program product for implementing the above method according to the present disclosure, and a computer readable storage medium on which the computer program codes for implementing the above method according to the present disclosure are recorded.

According to embodiments of the present disclosure, dimension reduction (preferably, column dimension reduction) is performed on a parameter matrix of a neural network and dimension reduction (preferably, row dimension reduction) is optionally performed on an input matrix corresponding to the parameter matrix, whereby computational amount in matrix multiplication can be greatly reduced and the processing speed of the neural network is significantly improved.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION

Figure 1:
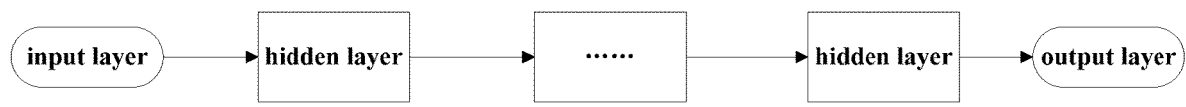
FIG. 1 is a schematic diagram showing a general architecture of a neural network.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Hereinafter, embodiments of the present disclosure will be described in detail with reference to FIG. 1 to FIG. 10.

Firstly, a general architecture of a neural network is described with reference to FIG. 1. FIG. 1 shows an example of a general architecture of a neural network.

As shown in FIG. 1, the neural network, also referred to as a deep neural network, generally includes an input layer, one or more hidden layers and an output layer. As the number of the hidden layers increases, a depth of the neural network is increased and thereby the performance of the neural network is improved. Taking the Convolutional Neural Network (CNN) as an example, the hidden layer generally includes one or more convolution layers, a fully connected layer, a dropout layer, a Rectified Linear Unit layer (ReLU layer), a pooling layer and the like.

As described above, with the increasing of the depth and scale of the neural network currently, computational complexity of the neural network is greatly increased, thereby reducing an execution efficiency of the neural network. Since approximately 99% of the processing time of the neural network is spent on the matrix multiplication for the convolution layer and the fully connected layer the processing speed of the entire neural network can be improved significantly if the computational amount of the matrix multiplication for the convolution layer and the fully connected layer can be reduced.

The present disclosure is made in view of such concept. Herein, it should be noted that, in the following description, the solution for improving the processing speed of the neural network according to the embodiment of the present disclosure is described by taking the convolution layer and/or the fully connected layer of the CNN as an example, but it should be understood that, the present disclosure is not limited thereto, and can be similarly applied to any operation involving matrix multiplication in any neural network. In addition, the technology according to the present disclosure may also be applied to similar matrix multiplication in other fields.

Figure 2:
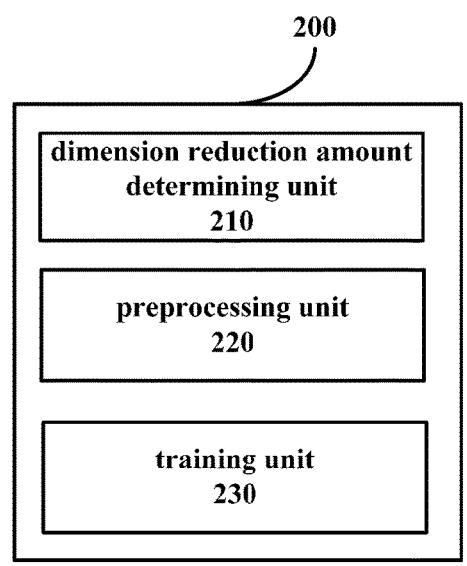
FIG. 2 is a block diagram showing a function configuration example of a device for improving a processing speed of a neural network according to an embodiment of the present disclosure.

FIG. 2 is a block diagram showing a function configuration example of a device for improving a processing speed of a neural network according to an embodiment of the present disclosure.

As shown in FIG. 2, a device 200 according to the embodiment includes a dimension reduction amount determining unit 210, a preprocessing unit 220 and a training unit 230. Function configurations of the respective units are described in detail hereinafter.

The dimension reduction amount determining unit 210 may be configured to determine, according to a predetermined processing speed improvement target, a dimension reduction amount of each of one or more parameter matrixes/matrices in a neural network obtained through training.

Preferably, the predetermined processing speed improvement target may be determined so that an effect on the performance of the neural network is within a tolerance range. It should be understood that, the improvement of the processing speed must ensure the effect on the performance of the neural network is in the tolerance range. Otherwise, although the processing speed of the neural network is significantly improved, an output accuracy of the neural network may be greatly reduced, which is not desired by a user.

The dimension reduction amount may be preferably a column dimension reduction amount. Assuming that a parameter matrix (also referred to as a weight matrix) A of any convolution layer or the fully connected layer of a CNN obtained through training is a m*k matrix, then A may be represented with the following formula (1):

$$A_W = \begin{vmatrix} w_{11} & w_{12} & \cdots & w_{1k} \\ w_{21} & w_{22} & \cdots & w_{2k} \\ \vdots & \vdots & \vdots & \vdots \\ w_{m1} & w_{m2} & \cdots & w_{mk} \end{vmatrix} \quad (1)$$

Generally, k>>m. For example, k may be 4.5 times m. Therefore, the computational amount in the matrix multiplication may be reduced more by reducing the column dimension k, resulting in more significant improvement of the processing speed of the neural network. In addition, a row dimension of a parameter matrix of any layer is generally related to the number of feature maps of the layer, and a column dimension is generally related to the number of hidden neurons of the layer. Therefore, improving the processing speed of the neural network by reducing the column dimension has a smaller effect on an output performance (such as output accuracy) of the neural network. As a matter of course, in the case that the reduction in the row dimension better facilitates the processing speed improvement and/or has a smaller effect on the system performance, the technology according to the present disclosure may be also applied to reduce the row dimension and/or to reduce both the row dimension and the column dimension.

Preferably, the dimension reduction amount determining unit 210 may be further configured to determine the column dimension reduction amount of each parameter matrix so that a parameter matrix of the one or more parameter matrixes which is closer to an input layer has a smaller column dimension reduction amount and that a sum of column dimension reduction amounts of all the parameter matrixes meets the predetermined processing speed improvement target. This is because the closer a hidden layer (here, a convolution layer and/or a fully connected layer) is to the input layer, the more a parameter matrix of the hidden layer affects the output accuracy of the neural network. In this case, preferably, the column dimension reduction amount of the parameter matrix of this hidden layer is smaller to avoid affecting the output accuracy of the neural network. As the layer number increases, the column dimension reduction amount of the parameter matrix of the corresponding layer may be accordingly increased.

Particularly, provided that the total number of convolution layers and the fully connected layer included in the CNN is L, that is, provided that there are L parameter matrixes, and an overall column dimension reduction amount (such as a reduction ratio) determined based on the predetermined processing speed improvement target is a, then the column dimension reduction amounts of the respective layers are determined as satisfying a relationship of $\alpha_1 \leq \alpha_2 \leq \alpha_3 \ldots \leq \alpha_L$, and $$\frac{\sum_{l=1}^{L} \alpha_l}{L} = \alpha,$$

where an order from 1 to L represents an ascending order of layer numbers starting from a hidden layer closest to the input layer.

In the embodiment of the present disclosure, the method for calculating the dimension reduction amounts of the respective layers is not specifically limited, as long as it is ensured the effect on the output performance of the neural network is within a predetermined tolerance range while satisfying the above constraint conditions.

The preprocessing unit 220 may be configured to preprocess each parameter matrix based on a dimension reduction amount of the parameter matrix.

specifically, provided that a column dimension reduction amount of an l-th parameter matrix is $\alpha_l$ and an original column dimension of the l-th parameter matrix is $k_l$, then the parameter matrix is preprocessed to be converted into a parameter matrix with a column dimension of $k'_l$ ($k'_l = \lfloor 1-\alpha_l \rfloor * k_l$, where "$\lfloor \ \rfloor$" represents a flooring operation, i.e., $k'_l$ is an integer).

Figure 3:
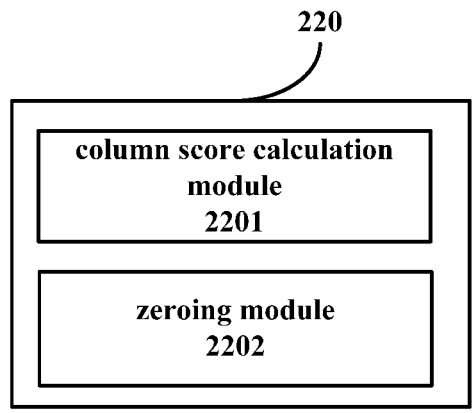
FIG. 3 is a block diagram showing a function configuration example of a preprocessing unit in the device shown in FIG. 2.

In the following, a specific configuration example of the preprocessing unit 220 is described in detail in conjunction with FIG. 3 and FIG. 4. FIG. 3 is a block diagram showing a function configuration example of the preprocessing unit shown in FIG. 2.

As shown in FIG. 3, the preprocessing unit 220 may include a column score calculation module 2201 and a zeroing module 2202. In the following, function configuration examples of the modules are described in detail.

The column score calculation module 2201 may be configured to calculate, for each parameter matrix, a column score of each of columns of the parameter matrix based on values of parameters in each column of the parameter matrix.

The column score calculation module 2201 may, for example, calculate a sum of absolute values of the parameters in each column as the column score of the column. The calculation process may be represented as $$S_j = \sum_{i=1}^{m} |w_{ij}| \ (1 \le j \le k).$$

The zeroing module 2202 may be configured to zero, for each parameter matrix, the parameters in a column the column score of which meets a predetermined condition according to the determined column dimension reduction amount and the calculated column scores of respective columns.

As an example embodiment, for example, the zeroing module 2202 may be configured to rank the calculated column scores $S_j$ of the respective columns of the l-th parameter matrix in an ascending/descending order of magnitudes of the column scores. Then, the parameters in a certain number of (for example, the number may be an integer obtained by rounding the value of $\alpha_l * k_l$) columns the column scores of which are ranked high/low (i.e., have lower column scores) are zeroed.

As another example embodiment, for example, the zeroing module 2202 may be configured to determine a column score threshold based on the calculated column scores of the respective columns and the column dimension reduction amount of the parameter matrix, and zero the parameters in the column the column score of which is less than the threshold. The specific calculation process can be designed by those skilled in the art based on the principle of the present disclosure and mathematical knowledge as required, which is not specifically limited herein.

Preferably, in order to make the effect on the performance of the neural network by the reduction of the column dimension of a parameter matrix be small as much as possible, in calculating the column scores of the respective columns, loss weights associated with the parameters in the parameter matrix may be also considered. The loss weight is also obtained by training the neural network, and may represent a contribution of a parameter in the parameter matrix to a loss of the neural network, hence can reflect, to a certain extent, importance of the parameter for the performance of the neural network. A loss weight associated with a parameter w may be represented with the following formula (2):

$$L_w = \sum \left| \frac{\partial E}{\partial W} \right| \tag{2}$$

In the formula, $$\frac{\partial E}{\partial W}$$

represents a loss weight of the parameter w in a backpropagation gradient calculation using different samples.

A method for obtaining a parameter matrix and the associated loss weights by training a neural network is the same as that in the prior art, and is not described in detail herein.

In the following, another function configuration example of the preprocessing unit in the above case is described in detail with reference to FIG. 4. FIG. 4 is a block diagram showing another function configuration example of the preprocessing unit of the device shown in FIG. 2.

Figure 4:
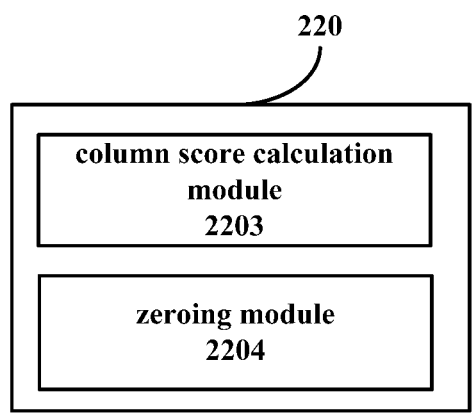
FIG. 4 is a block diagram showing another function configuration example of a preprocessing unit in the device shown in FIG. 2.

As shown in FIG. 4, the preprocessing unit 220 according to the embodiment may include a column score calculation module 2203 and a zeroing module 2204. Function configuration examples of the modules are described in detail hereinafter.

The column score calculation module 2203 may be configured to calculate, for each parameter matrix, the column score of each column of the parameter matrix according to the values of the parameters in the column and the loss weights associated with each of the parameters.

Specifically, the column score calculation module 2203 may be configured to normalize all of the parameters and the associated loss weights of each parameter matrix, for example, as values in a range from 0 to 1 inclusively. The normalization may be, for example, represented with the following formulas (3) and (4):

$$w_i^* = \frac{|w_i| - W_{min}}{W_{max} - W_{min}} \tag{3}$$

$$lw_i^* = \frac{|lw_i| - LW_{min}}{LW_{max} - LW_{min}} \tag{4}$$

In the above formulae, $w_i$ and $w_i^*$ respectively represent a parameter before normalization and a parameter after normalization, $W_{min}$ represents an absolute value of a parameter having a minimum absolute value in the parameter matrix, $W_{max}$ represents an absolute value of a parameter having a maximum absolute value in the parameter matrix, $l_{wi}$ and $l_{wi}^*$ respectively represent a loss weight before normalization and a loss weight after normalization, $LW_{min}$ represents an absolute value of a loss weight having a minimum absolute value in the parameter matrix and $LW_{max}$ represents an absolute value of a loss weight having a maximum absolute value in the parameter matrix.

The column score calculation module 2203 may be further configured to calculate the column score of each column based on the normalized parameters and the normalized loss weights. For example, a sum of weighted sums of the normalized parameters and the normalized associated loss weights of each column may be taken as the column score of the column. The calculation may be, for example, represented with the following formula (5):

$$S_j = \sum_{i=1}^{m} |\lambda \cdot w_{ij}^* + (1-\lambda) l w_{ij}^*|, \ 1 \leq j \leq k \qquad (5)$$

In formula (5), $\lambda$ is a balance parameter between a parameter and a loss weight associated with the parameter, and may be a predetermined empirical value or may be determined by a limited number of experiments according to actual conditions. For example, in the case that a contribution of the parameter and a contribution of the loss weight associated with the parameter are regarded as being equal to each other, $\lambda$ may be set as 0.5.

The zeroing module 2204 may be configured to zero, for each parameter matrix, parameters in a column of the parameter matrix meeting a predetermined condition based on the determined column dimension reduction amount and the calculated column scores of the columns. The zeroing operation performed by the zeroing module 2204 is substantially the same as the zeroing operation performed by the zeroing module 2202 in the embodiment described with reference to FIG. 3, and is not repeated herein.

It should be noted that, the column score calculation manners and the corresponding zeroing manners described above are merely examples but not limitations. Those skilled in the art can make appropriate variations based on the principle of the present disclosure, as long as it can be achieved the effect of the zeroed columns on the performance of the neural network is as small as possible, and these variations apparently fall within the scope of protection of the present disclosure.

Next, referring back to FIG. 2, the training unit 230 may be configured to retrain the neural network based on the preprocessing result to obtain one or more dimension-reduced parameter matrixes, so as to ensure the performance of the neural network meets a predetermined requirement.

Particularly, provided that the parameter matrix obtained through the preprocessing can be represented with the following formula (6):

$$A_W = \begin{vmatrix} w_{11} & 0 & w_{13} & 0 & w_{15} & \ldots & w_{1k} \\ w_{21} & 0 & w_{23} & 0 & w_{25} & \ldots & w_{2k} \\ \vdots & 0 & \vdots & \vdots & \vdots & \ldots & \vdots \\ w_{m1} & 0 & w_{m3} & 0 & w_{m5} & \ldots & w_{mk} \end{vmatrix} \qquad (6)$$

Then, the training unit 230 may retrain the neural network with training data and the one or more parameter matrixes with corresponding columns being zeroed as shown in formula (6), to obtain optimized parameters of the remaining columns, hence to ensure the performance of the neural network to meet the predetermined requirement. For example, provided that a column dimension of the retrained parameter matrix is k', then the retrained parameter matrix can be represented, for example, with the following formula (7):

$$A_W = \begin{vmatrix} w_{11} & 0 & w_{13} & 0 & w_{15} & \ldots & w_{1k} \\ w_{21} & 0 & w_{23} & 0 & w_{25} & \ldots & w_{2k} \\ \vdots & 0 & \vdots & \vdots & \vdots & \ldots & \vdots \\ w_{m1} & 0 & w_{m3} & 0 & w_{m5} & \ldots & w_{mk} \end{vmatrix} \Rightarrow A_W' = \begin{vmatrix} w_{11}' & w_{12}' & \ldots & w_{1k'}' \\ w_{21}' & w_{22}' & \ldots & w_{2k'}' \\ \vdots & \vdots & \vdots & \vdots \\ w_{m1}' & w_{m2}' & \ldots & w_{mk'}' \end{vmatrix} \qquad (7)$$

As can be seen, according to the embodiment of the present disclosure, the column dimension of the parameter matrix is reduced from k to k', while the row dimension of the parameter matrix is kept constant.

Alternatively, in the case that effect of the reduction of the row dimension on the system performance is within a tolerance range, the above process may be similarly performed to reduce the row dimension of the parameter matrix or reduce both the row dimension and column dimension. Specific operation processes and principles are substantially the same as the above processes, for which appropriate variations may be made by those skilled in the art according to the principle of the present disclosure to achieve corresponding dimension reduction, and thus will not be described in detail herein.

Preferably, the above process for achieving the predetermined processing speed improvement target by performing dimension reduction on the parameter matrix may be performed iteratively. For example, if the dimension reduction amount determined based on the predetermined processing speed improvement target is 50%, the column dimension can be firstly reduced from k to 0.75 k by performing the above dimension reduction process, and then can be further reduced from 0.75 k to 0.5 k by repeating a similar dimension reduction process. With such iteration, the predetermined processing speed improvement target is gradually approximated, and the effect on the performance of the neural network by the above dimension reduction can be reduced, thereby ensuring the output accuracy of the neural network. In the following, an embodiment in this case is described with reference to FIG. 5.

Figure 5:
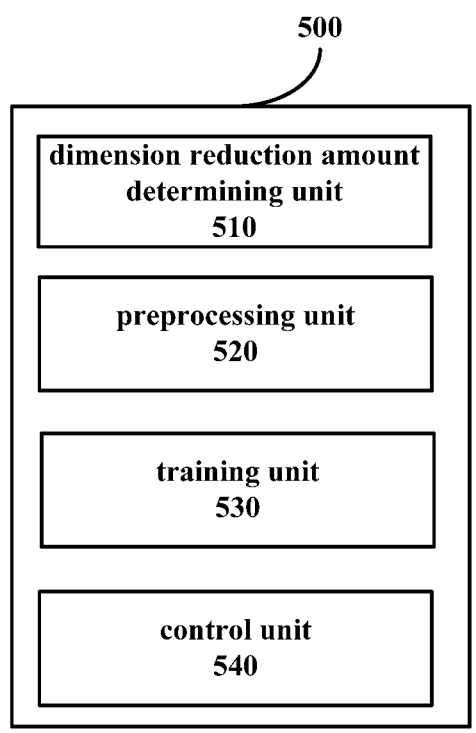
FIG. 5 is a block diagram showing a function configuration example of a device for improving a processing speed of a neural network according to another embodiment of the present disclosure.

FIG. 5 is a block diagram showing a function configuration example of a device for improving a processing speed of a neural network according to another embodiment of the present disclosure.

As shown in FIG. 5, a device 500 according to the embodiment may include a dimension reduction amount determining unit 510, a preprocessing unit 520, a training unit 530 and a control unit 540. Function configurations of the dimension reduction amount determining unit 510, preprocessing unit 520 and training unit 530 are substantially the same as those of the dimension reduction amount determining unit 210, preprocessing unit 220 and training unit 230 described with reference to FIG. 2. Therefore, contents not described in detail herein may be referred to corresponding descriptions in the above, and will not be repeated herein. In the following, only a function configuration example of the control unit 540 is described in detail.

The control unit 540 may be configured to control the dimension reduction amount determining unit 510, the preprocessing unit 520 and the training unit 530 to repeatedly perform their respective operations according to another predetermined processing speed improvement target, until one or more dimension reduced parameter matrixes meeting a final processing speed improvement target are obtained.

Specifically, the dimension reduction amount determining unit 510 may determine, according to another predetermined processing speed improvement target, a dimension reduction amount of each of the one or more dimension reduced parameter matrixes obtained through retraining. The preprocessing unit 520 may re-preprocess each parameter matrix based on the determined dimension reduction amount of the parameter matrix, and the training unit 530 may retrain the neural network based on the re-preprocessing result to obtain one or more parameter matrixes with dimensions being reduced again to ensure the performance of the neural network meets the predetermined requirement. The determining, the re-preprocessing and the retraining are repeated until the one or more dimension-reduced parameter matrixes meeting the final processing speed improvement target are obtained.

Figure 6:
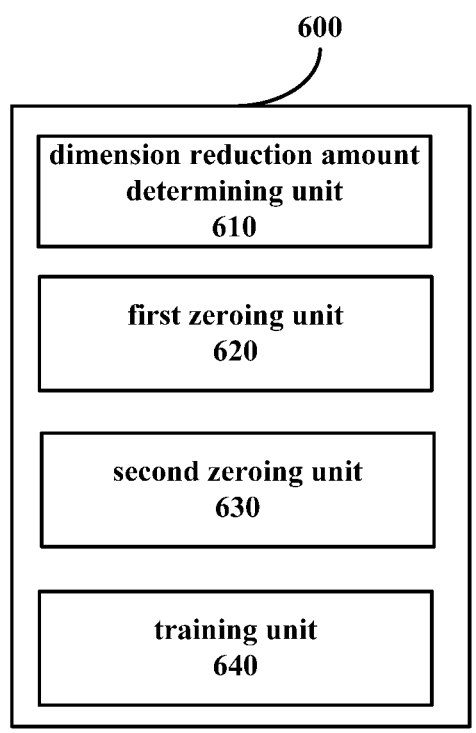
FIG. 6 is a block diagram showing a function configuration example of a device for improving a processing speed of a neural network according to yet another embodiment of the present disclosure.

FIG. 6 is a block diagram showing a function configuration example of a device for improving a processing speed of a neural network according to yet another embodiment of the present disclosure.

With reference to FIG. 6, a device 600 according to the embodiment of the present disclosure may include a dimension reduction amount determining unit 610, a first zeroing unit 620, a second zeroing unit 630 and a training unit 640. Function configurations of the dimension reduction amount determining unit 610 and the first zeroing unit 620 are substantially the same as those of the dimension reduction amount determining unit 210 and the preprocessing unit 220 described in the above with reference to FIG. 2. Therefore, contents not described in detail herein may be referred to corresponding descriptions in the above, and will not be repeated herein. In the following, only function configuration examples of the second zeroing unit 630 and the training unit 640 are described in detail.

The second zeroing unit 630 may be configured to zero, according to the zeroed column of each parameter matrix as determined by the first zeroing unit 620, elements in a corresponding row of an input matrix corresponding to the parameter matrix. The zeroing operation on the corresponding column of the parameter matrix performed by the first zeroing unit 620 may be referred to the description with reference to FIG. 2 to FIG. 4, and is not repeated herein.

Specifically, in a matrix multiplication for any convolution layer or a fully connected layer in the neural network, an output matrix C of the layer is a convolution of a parameter matrix $A_w$ and an input matrix B, i.e., $C=A_w*B$, where the input matrix B is a matrix of k rows and n columns. In this case, the output matrix C is a matrix of m rows and n columns. As can be seen from a general principle of the matrix multiplication, a row dimension of the matrix B needs to be equal to a column dimension of the matrix Aw. Therefore, in the case that the column dimension of the parameter matrix Aw is reduced, the row dimension of the input matrix B needs to be reduced accordingly. For example, provided that parameters in both the second column and the fourth column of the parameter matrix are zeroed, products of parameters in the second column and the fourth column of the parameter matrix with elements in the second row and the fourth row of the input matrix are always zeroes, regardless of values of the elements in the second and fourth rows of the input matrix. Therefore, elements in the second and fourth rows of the input matrix may be also zeroed in order to simplify the calculation process.

The training unit 640 may be configured to retrain the neural network according to the one or more parameter matrixes with corresponding columns being zeroed and one or more input matrixes with corresponding rows being zeroed to obtain the one or more dimension reduced parameter matrixes.

It can be understood that, as described in the above, in the case that the parameters in some columns of the parameter matrix are zeroed, the products of the parameters with the elements in corresponding rows of the input matrix are always zero regardless of the values of elements in the rows. Therefore, the second zeroing unit 630 is optional, and the neural network may be retrained according to only the parameter matrix with corresponding columns being zeroed, without performing any processing on the input matrix, as described in the above with reference to FIG. 2.

Herein, it should be noted that, the units and/or modules described with reference to FIG. 2 to FIG. 6 are only function modules divided based on functions thereof, and are not intended to limit the specific implementations. In an actual implementation, the above function units may be implemented as separate physical entities or may be implemented by a single entity (such as a processor (CPU, DSP or the like), an integrated circuit, a programmable logical device or the like).

Corresponding to the above device embodiments, the present disclosure further provides an embodiment of a method in the following.

Figure 7:
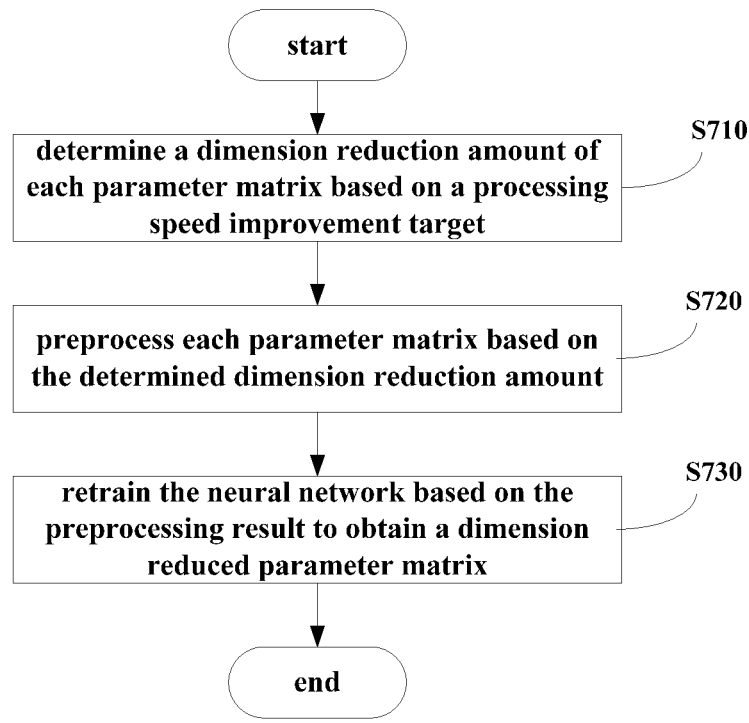
FIG. 7 is a flowchart showing a process example of a method for improving a processing speed of a neural network according to an embodiment of the present disclosure.

FIG. 7 is a flowchart showing a process example of a method for improving a processing speed of a neural network according to an embodiment of the present disclosure.

As shown in FIG. 7, the method starts at step S710. In step S710, it is determined according to a predetermined processing speed improvement target a dimension reduction amount of each of one or more parameter matrixes in a neural network obtained through training.

Next, the method proceeds to step S720. In step S720, each parameter matrix is preprocessed based on the dimension reduction amount of the parameter matrix.

Preferably, the dimension reduction amount may represent a column dimension reduction amount of each parameter matrix, and the preprocessing step S720 may further include: calculating, for each parameter matrix, a column score of each of columns of the parameter matrix according to values of parameters in each column of the parameter matrix; and zeroing, for each parameter matrix, the parameters in a column of the parameter matrix the column score of which meets a predetermined condition, according to the column dimension reduction amount of the parameter matrix.

Preferably, calculating the column score may further include: calculating, for each parameter matrix, a sum of absolute values of the parameters in each column of the parameter matrix as the column score of the column.

Preferably, calculating the column score may further include: calculating, for each parameter matrix, the column score according to loss weights associated with the parameters in each column of the parameter matrix.

Preferably, calculating the column sore may further include: normalizing all of the parameters and the loss weights in each of the one or more parameter matrixes; and calculating, for each parameter matrix, a sum of weighted sums of the normalized parameters and the normalized loss weights in each column of the parameter matrix as the column score.

The preprocessing process may be referred to the foregoing description with reference to FIG. 3 and FIG. 4, and are not described in detail hereinafter.

Next, the method proceeds to step S730. In step S730, the neural network is retrained based on the preprocessing result to obtain the one or more dimension reduced parameter matrixes so as to ensure performance of the neural network meets a predetermined requirement.

It should be noted that, the embodiment of method here corresponds to the embodiments of the device described above with reference to FIG. 2 to FIG. 6, thus contents not described in detail here may be referred to corresponding description in the above embodiments of the device, and are not described in detail herein.

Next, application of the above solution for improving the processing speed of the neural network according to the embodiments of the present disclosure in the neural network is described with reference to FIG. 8 and FIG. 9.

Figure 8:
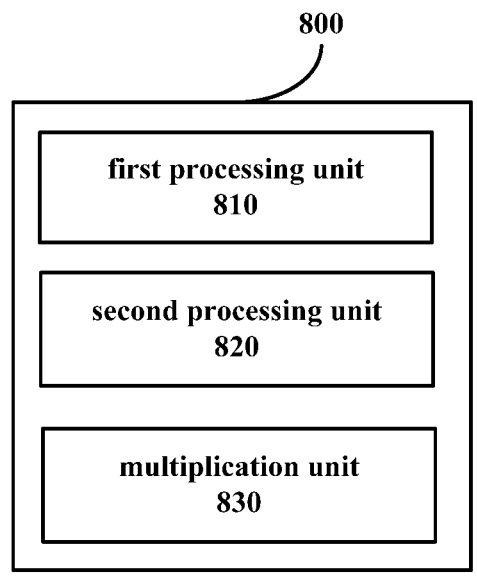
FIG. 8 is a block diagram showing a function configuration example of a device for performing an inference process in a neural network according to an embodiment of the present disclosure.

FIG. 8 is a block diagram showing a function configuration example of a device for performing an inference process in a neural network according to an embodiment of the present disclosure.

As shown in FIG. 8, a device 800 according to the embodiment may include a first processing unit 810, a second processing unit 820 and a multiplication unit 830. Function configuration examples of the units are respectively described in detail hereinafter.

The first processing unit 810 may be configured to convert a current parameter matrix of a target layer as a to-be-processed object into a dimension-reduced parameter matrix by performing the above method for improving the processing speed of the neural network. Preferably, the first processing unit 810 may convert the current parameter matrix into a column dimension reduced parameter matrix.

Specifically, the first processing unit 810 may convert the parameter matrix of the target layer (such as convolution layer or fully connected layer) into the dimension reduced parameter by performing the above method for improving the processing speed of the neural network. For example, an m*k parameter matrix may be converted into an m*k' parameter matrix, where k'<k.

The second processing unit 820 may be configured to convert, according to the dimension reduced parameter matrix, an input matrix corresponding to the current parameter matrix into a dimension reduced input matrix accordingly.

Specifically, based on a column of the parameter matrix the parameters in which are zeroed during the dimension reduction for the parameter matrix, elements in a corresponding row of the input matrix are removed accordingly. For example, if parameters in the second and fourth columns of the parameter matrix are zeroed, then elements in the second and fourth rows of the input matrix are directly removed, thereby converting the k*n input matrix to the k'*n input matrix.

The multiplication unit 830 may be configured to multiply the dimension reduced parameter matrix by the dimension reduced input matrix to obtain an output matrix of the target layer.

As can be seen, with the technology according to the present disclosure, dimension reduction is performed on a parameter matrix and an input matrix, computational amount in an inference engine can be reduced significantly, thereby greatly shortening inference time and improving the processing speed of the neural network. Meanwhile, dimensions of the output matrix is maintained constant (always being m*n), and it is ensured the performance of the neural network meets a predetermined performance requirement.

Here, it should be noted that, the units described with reference to FIG. 8 are only function modules divided based on functions thereof, and are not intended to limit the specific implementations. In an actual implementation, the above function units may be implemented as separate physical entities, or may be implemented by a single entity (such as a processor (CPU, DSP or the like), an integrated circuit, a programmable logic device or the like).

Corresponding to the above device embodiment according to the present disclosure, the present disclosure further provides an embodiment of a method in the following.

Figure 9:
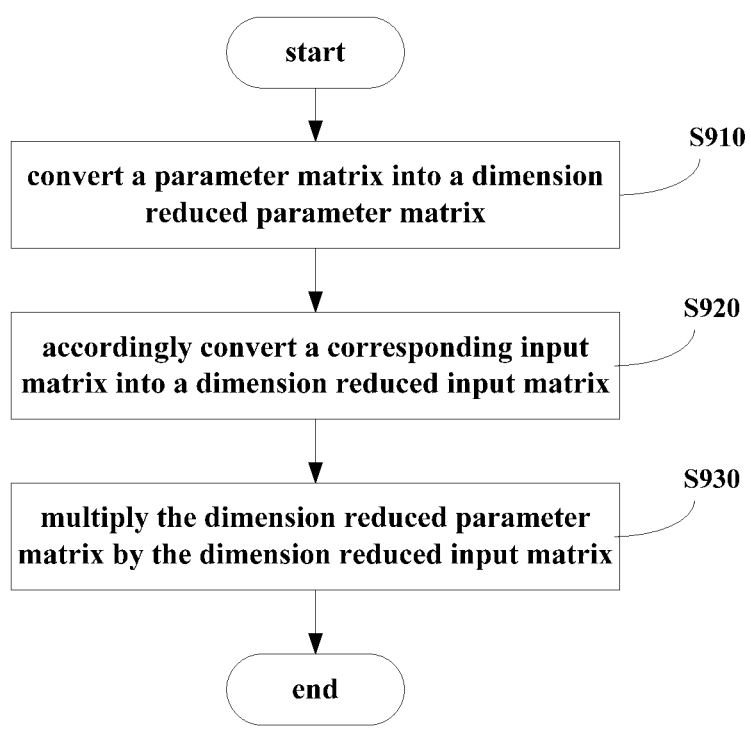
FIG. 9 is a flowchart showing a process example of a method executed in an inference engine of a neural network according to an embodiment of the present disclosure.

FIG. 9 is a flowchart showing a process example of a method executed in an inference engine of a neural network according to an embodiment of the present disclosure.

As shown in FIG. 9, the method starts at step S910. In step S910, a current parameter matrix of a target layer as a to-be-processed object is converted into a dimension reduced parameter matrix by performing the above method for improving the processing speed of a neural network. Preferably, the current parameter matrix may be converted into a column dimension reduced parameter matrix.

Then, the method proceeds to step S920. In step S920, an input matrix corresponding to the current parameter matrix is accordingly converted into a dimension reduced input matrix based on the dimension reduced parameter matrix. Specifically, based on a column of the parameter matrix the parameters in which are zeroed during the dimension reduction for the parameter matrix, elements in a corresponding row of the input matrix are removed accordingly.

Next, the method proceeds to step S930. In step S930, the dimension reduced parameter matrix is multiplied by the dimension reduced input matrix to obtain an output matrix of the target layer.

It should be noted that, the method embodiment herein corresponds to the above device embodiment described with reference to FIG. 8, thus contents not described in detail here may be referred to corresponding descriptions in the above device embodiment, and are not described in detail herein.

It should be understood that machine-executable instructions in a storage medium and a program product according to the embodiments of the present disclosure may be also configured to execute the methods corresponding to the device embodiments described above, thus contents which are not described in detail may be referred to foregoing description at corresponding positions, which are not described repeatedly here anymore.

Accordingly, a storage medium on which the above program product storing machine executable instructions is carried is also included in the disclosure. The storage medium includes but not limited to a floppy disk, an optical disk, a magneto-optical disk, a storage card, a memory rod and the like.

Figure 10:
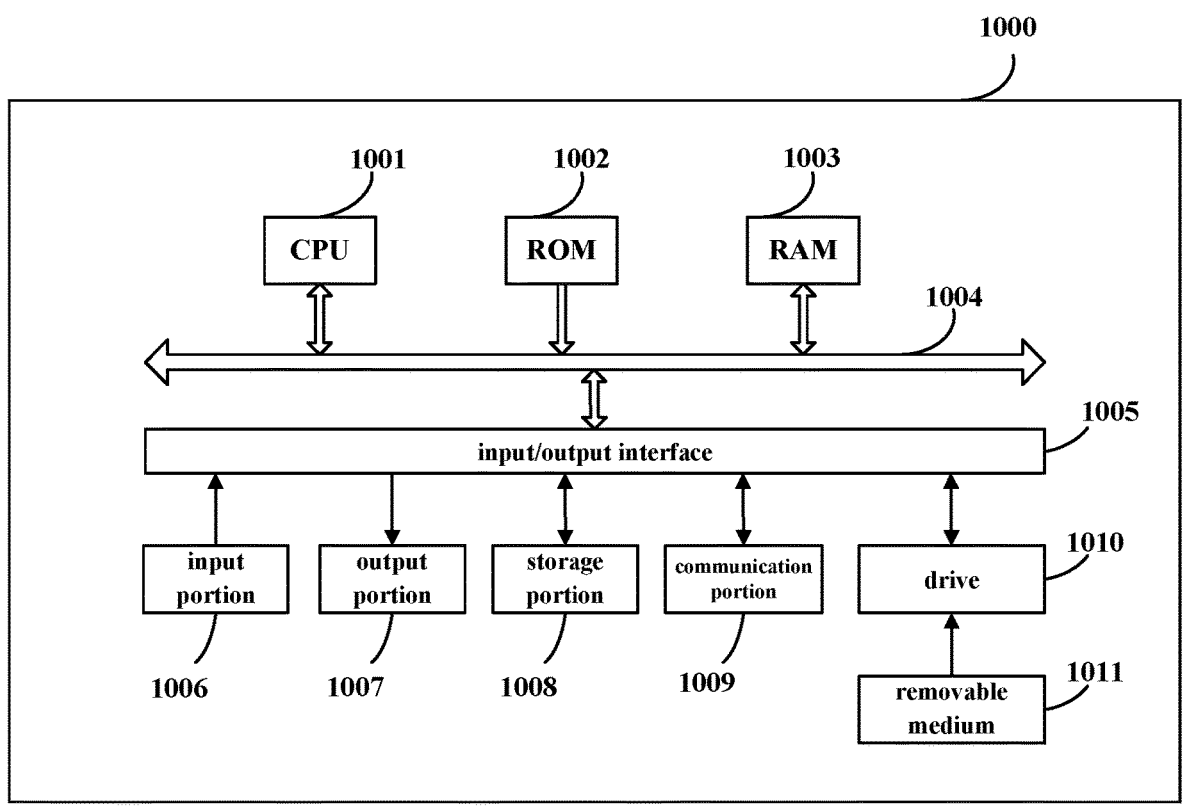
FIG. 10 is a block diagram showing a structural example of a general-purpose personal computer which can be used for implementing the embodiments of the present disclosure.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 1000 illustrated in FIG. 10, which can perform various functions when various programs are installed thereon. FIG. 10 is a block diagram showing a structural example of a general-purpose personal computer which can be used for implementing the embodiments of the present disclosure.

In FIG. 10, a Central Processing Unit (CPU) 1001 performs various processes according to a program stored in a Read Only Memory (ROM) 1002 or loaded from a storage portion 1008 into a Random Access Memory (RAM) 1003 in which data required when the CPU 1001 performs the various processes is also stored as needed.

The CPU 1001, the ROM 1002 and the RAM 1003 are connected to each other via a bus 1004 to which an input/output interface 1005 is also connected.

The following components are connected to the input/output interface 1005: an input portion 1006 including a keyboard, a mouse, etc.; an output portion 1007 including a display, e.g., a Cathode Ray Tube (CRT), a Liquid Crystal Display (LCD), etc., a speaker, etc.; a storage portion 1008 including a hard disk, etc.; and a communication portion 1009 including a network interface card, e.g., an LAN card, a modem, etc. The communication portion 1009 performs a communication process over a network, e.g., the Internet.

A drive 1010 is also connected to the input/output interface 1005 as needed. A removable medium 1011, e.g., a magnetic disk, an optical disk, an magneto optical disk, a semiconductor memory, etc., can be installed on the drive 1010 as needed so that a computer program fetched therefrom can be installed into the storage portion 1008 as needed.

In the case that the foregoing series of processes are performed in software, a program constituting the software is installed from a network, e.g., the Internet, etc., or a storage medium, e.g., the removable medium 1011, etc.

Those skilled in the art shall appreciate that such a storage medium will not be limited to the removable medium 1011 illustrated in FIG. 10 in which the program is stored and which is distributed separately from the apparatus to provide a user with the program. Examples of the removable medium 1011 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1002, a hard disk included in the storage portion 1008, etc., in which the program is stored and which is distributed together with the apparatus including the same to the user. The storage medium may also be a non-transitory computer readable storage medium.

Preferred embodiments of the disclosure have been described above with reference to the drawings, but the disclosure is not limited to the above examples of course. Those skilled in the art may devise various alternations and modifications within the scope of the appended claims, and it should be understood that these alternations and modifications would naturally fall within the technical scope of the disclosure.

For example, multiple functions included in one unit in the above embodiments may be implemented by separated devices. Alternatively, multiple functions implemented by multiple units in the above embodiments may be implemented by separated devices respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

Although the disclosure and the advantages thereof have been described in details, it shall be appreciated that various modifications, substitutions and variations can be made without departing from the spirit and scope of the disclosure as defined by the appended claims. Furthermore, the terms "include", "comprise" or any variants thereof in the embodiments of the disclosure are intended to encompass nonexclusive inclusion so that a process, method, article or apparatus including a series of elements includes both those elements and other elements which are not listed explicitly or an element(s) inherent to the process, method, article or apparatus. Without much more limitation, an element being defined by a sentence "include/comprise a(n) . . . " will not exclude presence of an additional identical element(s) in the process, method, article or apparatus including the element.

The following solutions are further provided according to the embodiments of the present disclosure, including but not limited to:

Solution 1. A device for improving a processing speed of a neural network, the device comprising a processor configured to perform:

determining, according to a predetermined processing speed improvement target, a dimension reduction amount of each of one or more parameter matrixes/matrices in the neural network obtained through training;

preprocessing each parameter matrix based on the dimension reduction amount of the parameter matrix; and retraining the neural network based on a result of the preprocessing to obtain one or more dimension reduced parameter matrixes so as to ensure performance of the neural network meets a predetermined requirement.

Solution 2. The device according to solution 1, wherein the dimension reduction amount represents a column dimension reduction amount of each parameter matrix, and the processor is further configured to perform the pre-processing by performing following operations for each parameter matrix:

calculating a column score of each of columns of the parameter matrix according to values of parameters in each column of the parameter matrix; and zeroing, according to the column dimension reduction amount of the parameter matrix, the parameters in a column the column score of which meets a predetermined condition.

Solution 3. The device according to solution 2, wherein the processor is further configured to calculate, for each parameter matrix, a sum of absolute values of the parameters in each column of the parameter matrix as the column score of the column.

Solution 4. The device according to solution 2, wherein the processor is further configured to calculate, for each parameter matrix, the column score according to loss weights associated with the parameters in each column of the parameter matrix.

Solution 5. The device according to solution 4, wherein the processor is further configured to:

normalize all of the parameters and the loss weights in each of the one or more parameter matrixes; and calculate, for each parameter matrix, a sum of weighted sums of the normalized parameters and the normalized loss weights in each column of the parameter matrix as the column score.

Solution 6. The device according to solution 2, wherein the processor is further configured to perform the zeroing by:

determining, for each parameter matrix, a threshold based on the determined column dimension reduction amount and the calculated column scores of the columns; and zeroing the parameters in a column, the column score of which is less than the threshold, of each parameter matrix.

Solution 7. The device according to solution 2, wherein the processor is further configured to perform the zeroing by:

ranking the column scores of the columns of each parameter matrix based on magnitudes of the column scores; and zeroing, based on the determined column dimension reduction amount, the parameters in a predetermined number of columns, the column scores of which are ranked high or low, of each parameter matrix.

Solution 8. The device according to solution 2, wherein the processor is further configured to retrain, according to the one or more parameter matrixes with corresponding columns being zeroed, the neural network to obtain one or more column dimension reduced parameter matrixes.

Solution 9. The device according to solution 2, wherein the processor is further configured to determine the column dimension reduction amount of each of the one or more parameter matrixes, so that a parameter matrix of the one or more parameter matrixes, which is closer to an input layer, has a smaller column dimension reduction amount, and that a sum of the column dimension reduction amounts of all the parameter matrixes meet the predetermined processing speed improvement target.

Solution 10. The device according to solution 2, wherein the processor is further configured to:

zero, according to the zeroed column of each parameter matrix, elements in a corresponding row of an input matrix corresponding to the parameter matrix; and retrain the neural network according to the one or more parameter matrixes with corresponding columns being zeroed and one or more input matrixes with corresponding rows being zeroed to obtain the one or more dimension reduced parameter matrixes.

Solution 11. The device according to any of solution 1 to solution 10, wherein the processor is further configured to perform:

determining, according to another predetermined processing speed improvement target, a dimension reduction amount of each of the one or more dimension reduced parameter matrixes obtained through retraining;

re-preprocessing each parameter matrix based on the determined dimension reduction amount of the parameter matrix; and retraining, based on a result of the re-preprocessing, the neural network to obtain one or more parameter matrixes with dimensions being reduced again to ensure the performance of the neural network meets the predetermined requirement, wherein the determining, the re-preprocessing and the retraining are performed repeatedly until one or more dimension reduced parameter matrixes meeting a final processing speed improvement target are obtained.

Solution 12. The device according to any of solution 1 to solution 10, wherein the predetermined processing speed improvement target is determined so that an effect on the performance of the neural network is within a tolerance range.

Solution 13. The device according to any of solution 1 to solution 10, wherein the neural network comprises a convolutional neural network (CNN).

Solution 14. The device according to any of solution 1 to solution 10, wherein in the case that the neural network is a convolutional neural network (CNN), the one or more parameter matrixes represent parameter matrixes of one or more convolution layers and/or a fully connected layer.

Solution 15. A method for improving a processing speed of a neural network, the method comprising:

determining, according to a predetermined processing speed improvement target, a dimension reduction amount of each of one or more parameter matrixes in the neural network obtained through training;

preprocessing each parameter matrix based on the dimension reduction amount of the parameter matrix; and retraining the neural network based on a result of the preprocessing to obtain one or more dimension reduced parameter matrixes so as to ensure performance of the neural network meets a predetermined requirement.

Solution 16. The method according to solution 15, wherein the dimension reduction amount represents a column dimension reduction amount of each parameter matrix, and the preprocessing further comprises:

calculating, for each parameter matrix, a column score of each of columns of the parameter matrix according to values of parameters in each column of the parameter matrix; and zeroing, for each parameter matrix, the parameters in a column of the parameter matrix the column score of which meets a predetermined condition, according to the column dimension reduction amount of the parameter matrix.

Solution 17. The method according to solution 16, wherein calculating the column score further comprises: calculating, for each parameter matrix, a sum of absolute values of the parameters in each column of the parameter matrix as the column score of the column.

Solution 18. The method according to solution 16, wherein calculating the column score further comprises: calculating, for each parameter matrix, the column score according to loss weights associated with the parameters in each column of the parameter matrix.

Solution 19. The method according to solution 18, wherein calculating the column score further comprises:

normalizing all of the parameters and the loss weights in each of the one or more parameter matrixes; and calculating, for each parameter matrix, a sum of weighted sums of the normalized parameters and the normalized loss weights in each column of the parameter matrix as the column score.

Solution 20. A device for performing an inference process in a neural network, the device comprising a processor configured to:

convert a current parameter matrix into a dimension reduced parameter matrix by performing the method according to any of solution 15 to solution 19;

convert, according to the dimension reduced parameter matrix, an input matrix corresponding to the current parameter matrix into a dimension reduced input matrix accordingly; and multiply the dimension reduced parameter matrix by the dimension reduced input matrix to obtain an output matrix.

Solution 21. A non-transitory computer readable storage medium for controlling a computer according to the method of any of solution 15 to solution 19.

What is claimed is:

1. A device for improving processing speed of a neural network, comprising:

a processor configured to determine, according to a predetermined processing speed improvement target, a columns dimension reduction amount of each of at least one parameter matrix in the neural network obtained through training, preprocess each parameter matrix based on the columns dimension reduction amount thereof, by calculating a column score of each of the columns of the parameter matrix according to values of parameters in each column of the parameter matrix, zeroing, according to the columns dimension reduction amount of the parameter matrix, the parameters in a column where the column score meets a predetermined condition to obtain a zeroed column, and zeroing, according to the zeroed column of each parameter matrix, elements in a corresponding row of an input matrix corresponding to the parameter matrix, and retrain the neural network according to parameter matrices with corresponding columns being zeroed and at least one input matrix with corresponding rows being zeroed to obtain at least one columns dimension reduced parameter matrix to ensure performance of the neural network meets a predetermined requirement.

2. The device according to claim 1, wherein the processor is further configured to calculate, for each parameter matrix, a sum of absolute values of the parameters in each column of the parameter matrix as the column score of the column.

3. The device according to claim 1, wherein the processor is further configured to calculate, for each parameter matrix, the column score according to loss weights associated with the parameters in each column of the parameter matrix.

4. The device according to claim 3, wherein the processor is further configured to:

normalize all of the parameters and the loss weights in each parameter matrix; and calculate, for each parameter matrix, a sum of weighted sums of normalized parameters and normalized loss weights in each column of the parameter matrix as the column score.

5. The device according to claim 1, wherein the processor is further configured to perform the zeroing by:

determining, for each parameter matrix, a threshold based on a determined columns dimension reduction amount and calculated column scores of the columns; and zeroing the parameters in the column, where the column score is less than the threshold, of each parameter matrix.

6. The device according to claim 1, wherein the processor is further configured to perform the zeroing by:

ranking the column scores of the columns of each parameter matrix based on magnitudes of the column scores; and zeroing, based on a determined column dimension reduction amount, the parameters in a predetermined number of columns, where the column scores are ranked one of high and low, of each parameter matrix.

7. The device according to claim 1, wherein the processor is further configured to determine a first columns dimension reduction amount of a first parameter matrix, closer to an input layer than a second parameter matrix, where the first columns dimension reduction amount is smaller than a second column dimension reduction amount of the second parameter matrix, calculate a sum of column dimension reduction amounts of all parameter matrices to meet the predetermined processing speed improvement target.

8. The device according to claim 1, wherein the processor is further configured to perform:

determining, according to another predetermined processing speed improvement target, a determined dimension reduction amount of each of the at least one columns dimension reduced parameter matrix obtained through retraining;

re-preprocessing each parameter matrix based on the determined dimension reduction amount of the parameter matrix; and retraining, based on a result of the re-preprocessing, the neural network to obtain at least one parameter matrix with dimensions being reduced again to ensure the performance of the neural network meets the predetermined requirement, wherein the determining, the re-preprocessing and the retraining are performed repeatedly until at least one dimension reduced parameter matrix meeting a final processing speed improvement target is obtained.

9. The device according to claim 1, wherein the predetermined processing speed improvement target is determined where an effect on the performance of the neural network is within a tolerance range.

10. The device according to claim 1, wherein the neural network comprises a convolutional neural network (CNN).

11. The device according to claim 1, wherein the neural network is a convolutional neural network (CNN), and the at least one parameter matrix represents parameter matrices of one or more convolution layers and/or a fully connected layer.

12. A method for improving a processing speed of a neural network, the method comprising:

determining, according to a predetermined processing speed improvement target, a columns dimension reduction amount of each of at least one parameter matrix in the neural network obtained through training;

preprocessing each parameter matrix based on the columns dimension reduction amount of the parameter matrix by calculating, for each parameter matrix, a column score of columns of the parameter matrix according to values of parameters in each column of the parameter matrix, zeroing, for each parameter matrix, the parameters in a column of the parameter matrix the column score of which meets a predetermined condition, according to the column dimension reduction amount of the parameter matrix to obtain a zeroed column, and zeroing, according to the zeroed column of each parameter matrix, elements in a corresponding row of an input matrix corresponding to the parameter matrix; and retraining the neural network according to parameter matrices with corresponding columns being zeroed and at least one input matrix with corresponding rows being zeroed to obtain at least one columns dimension reduced parameter matrix to ensure performance of the neural network meets a predetermined requirement.

13. The method according to claim 12, wherein the calculating the column score includes calculating, for each parameter matrix, a sum of absolute values of the parameters in each column of the parameter matrix as the column score of the column.

14. The method according to claim 12, wherein the calculating the column score includes calculating, for each parameter matrix, the column score according to loss weights associated with the parameters in each column of the parameter matrix.

15. The method according to claim 14, wherein the calculating the column score includes:
   normalizing all of the parameters and the loss weights in each of the at least one parameter matrix; and
   calculating, for each parameter matrix, a sum of weighted sums of normalized parameters and normalized loss weights in each column of the parameter matrix as the column score.

16. A device for performing an inference process in a neural network, the device comprising a processor configured to:
   convert a current parameter matrix into a dimension reduced parameter matrix by performing the method according to claim 12;
   convert, according to the dimension reduced parameter matrix, an input matrix corresponding to a current parameter matrix into a dimension reduced input matrix; and
   multiply the dimension reduced parameter matrix by the dimension reduced input matrix to obtain an output matrix.

* * * * *